United States Patent [19]
Hiramatsu

[11] Patent Number: 5,374,110
[45] Date of Patent: Dec. 20, 1994

[54] PRETENSIONER FOR SEAT BELTS
[75] Inventor: Koji Hiramatsu, Shiga, Japan
[73] Assignee: Takata Corporation, Tokyo, Japan
[21] Appl. No.: 7,184
[22] Filed: Jan. 21, 1993
[30] Foreign Application Priority Data
  Jan. 21, 1992 [JP] Japan ................. 4-029092
[51] Int. Cl.⁵ .............................. B60R 22/12
[52] U.S. Cl. ..................... 297/480; 297/468
[58] Field of Search .......... 297/480, 478, 468
[56] References Cited
U.S. PATENT DOCUMENTS
4,913,497  4/1990  Knabel et al. .............. 297/480
4,999,004  3/1991  Skanberg et al. ........... 297/480

FOREIGN PATENT DOCUMENTS
1-119455  5/1989  Japan.

*Primary Examiner*—Kenneth J. Dorner
*Assistant Examiner*—Milton Nelson, Jr.
*Attorney, Agent, or Firm*—Brumbaugh, Graves, Donohue & Raymond

[57] ABSTRACT

A pretensioner for a vehicle seat belt system comprises a fixed support member and an axially acting driving device having an output member that is movable along an axis upon operation of the driving device. The driving device is supported by the support member for movement relative to it along the axis. A trigger mechanism mounted on the driving device normally restrains the driving device by releasably coupling the output member thereof to the support member. The trigger mechanism is released in response to acceleration of an inertia mass greater than a predetermined value. The inertia mass for releasing the trigger is the driving device and the trigger mechanism, which move relative to the support member. A traction member is engaged by the output member of the driving device and transmits movement of the output member to the belt system component upon operation of the driving device.

1 Claim, 3 Drawing Sheets

PRETENSIONER FOR SEAT BELTS

BACKGROUND OF THE INVENTION

The present invention relates to a pretensioner for vehicle seat belts, and in particular to a pretensioner suitable for pretensioning a belt by pulling on a buckle to which the belt is connected.

In some seat belt systems used in vehicles such as automobiles, a pretensioner is provided for preventing movement of the body of an occupant by tightening of the belt when excessive acceleration is applied on the vehicle and thereby providing greater restraint of the occupant. Some pretensioners use a mechanical sensor having an inertia body for detecting acceleration to initiate the operation of a power source, such as a torsion bar, a compression coil spring, a spiral spring, an air cylinder, or the like, which is coupled to a component of the seat belt system and tightens the belt upon operation of the power source in response to a high acceleration detected by the mechanical sensor. Because the power source must produce a very large force in order to move the belt instantaneously before the occupant is thrown forward, the power source must be restrained by a very large force. Releasing the large restraining force requires that the inertia body be large and heavy.

Japanese Patent Laid-open Publication No. 1-119455 discloses a seat belt pretensioner in which the power source for applying pretension to the belt is an air cylinder, which is attached to a buckle support bracket, and the piston of the power source cylinder, which is moveable along the cylinder, serves as an inertia mass for initiating the operation of the air cylinder.

In order to provide it with sufficient mass to initiate operation of the pretensioner, the air cylinder piston must be large, which means that the cylinder also has to be large and heavy. The use of the air cylinder piston as the inertia mass is not an altogether satisfactory arrangement from the standpoint of making the pretensioner of light weight and compact construction.

SUMMARY OF THE INVENTION

An object of the present invention is to provide a pretensioner that is light in weight and compact and in which the piston is not used as the inertia mass for initiating operation of the power source. Another object is to provide a pretensioner that does not use a separate inertia body for releasing a trigger mechanism, thus reducing the number of components and contributing to the efficient use of space and avoiding additional weight.

The foregoing object is attained, in accordance with the present invention, by a pretensioner for a vehicle seat belt system comprising a fixed support member, an axially acting driving device having an output member movable along an axis upon operation of the driving means, the driving device being supported by the support member for movement relative to it along the axis, and a trigger mechanism mounted on the driving device for normally restraining the driving device by releasably coupling the output member thereof to the support member and for releasing the driving device in response to acceleration of an inertia mass greater than a predetermined value. The inertia mass for releasing the trigger is the driving device and the trigger device itself, which move relative to the support member. A traction member is engaged by the output member of the driving device and transmits movement of the output member to the belt system component upon operation of the driving device.

When an acceleration greater than a predetermined value is applied to the vehicle, the driving device and the trigger mechanism are displaced axially relative to the support member and cause the trigger to release the output member from its connection with the support member. The output member of the drive device is thereupon rapidly driven axially, thereby engaging it with the traction member and applying pretension to the seat belt.

For a better understanding of the invention, reference may be made to the following description of an exemplary embodiment, taken in conjunction with the accompanying drawings.

DESCRIPTION OF THE EMBODIMENT

Figure 1:
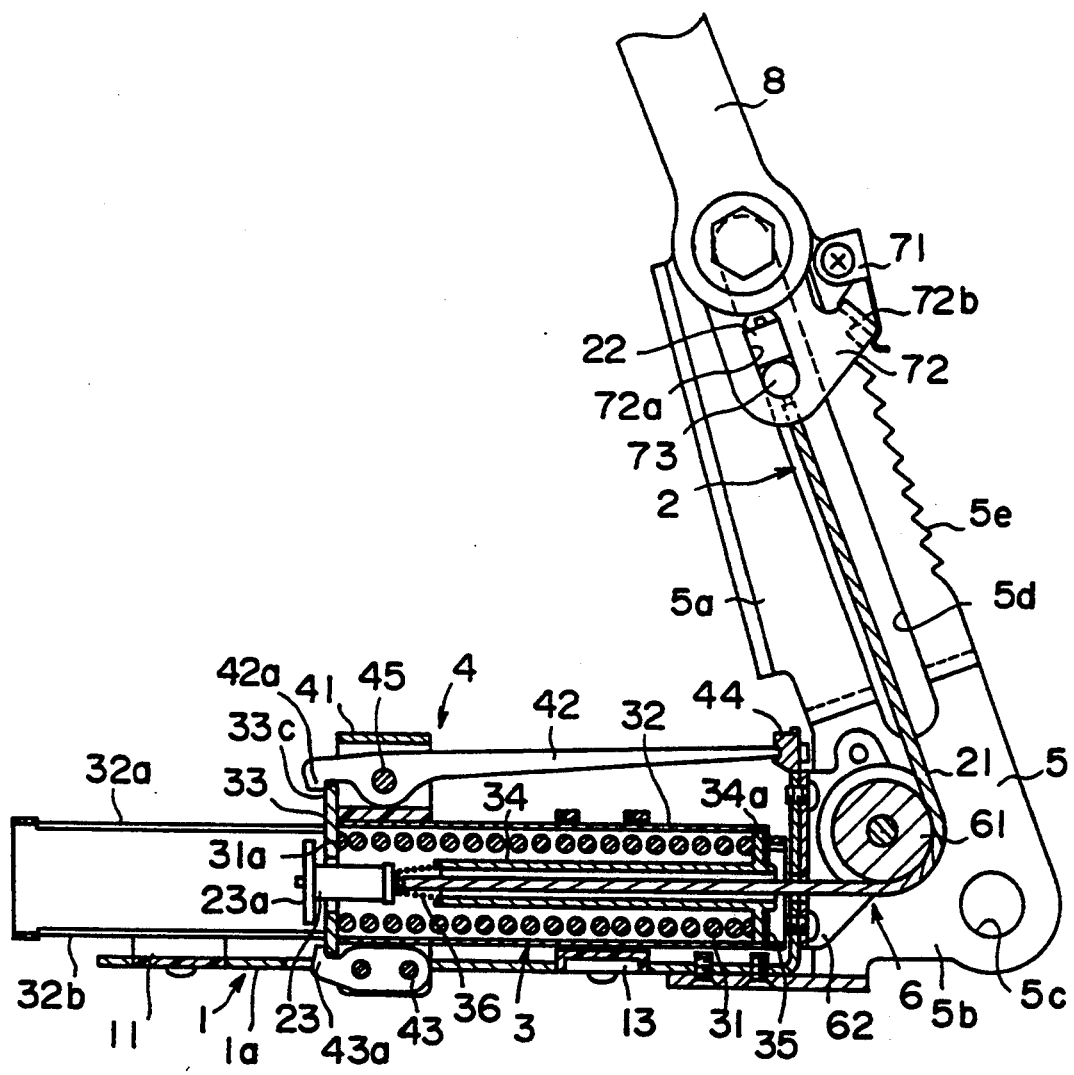
FIG. 1 is a side view of an embodiment of the invention applied to a buckle pretensioner.

The embodiment, which is a buckle pretensioner, comprises a fixed support member 1 and an axially acting driving device 3 having an output member 31a that is movable along an axis upon operation of the driving device. The driving device 3 is supported by the support member 1 for movement relative to it along the axis. A trigger mechanism 4 is mounted on the driving device 3 and normally restrains the driving device by releasably coupling the output member 31a to the support member 1. The trigger mechanism 4 releases the driving device 3 in response to acceleration of an inertia mass greater than a predetermined value. The inertia mass for releasing the trigger mechanism 4 is the driving device 3 and the trigger mechanism 4 itself, which move together relative to the support member. A traction member 2 is engaged by the output member 31a of the driving device and transmits movement of the output member to a belt system component, in this case a buckle (not shown), upon operation of the driving device.

Figure 2:
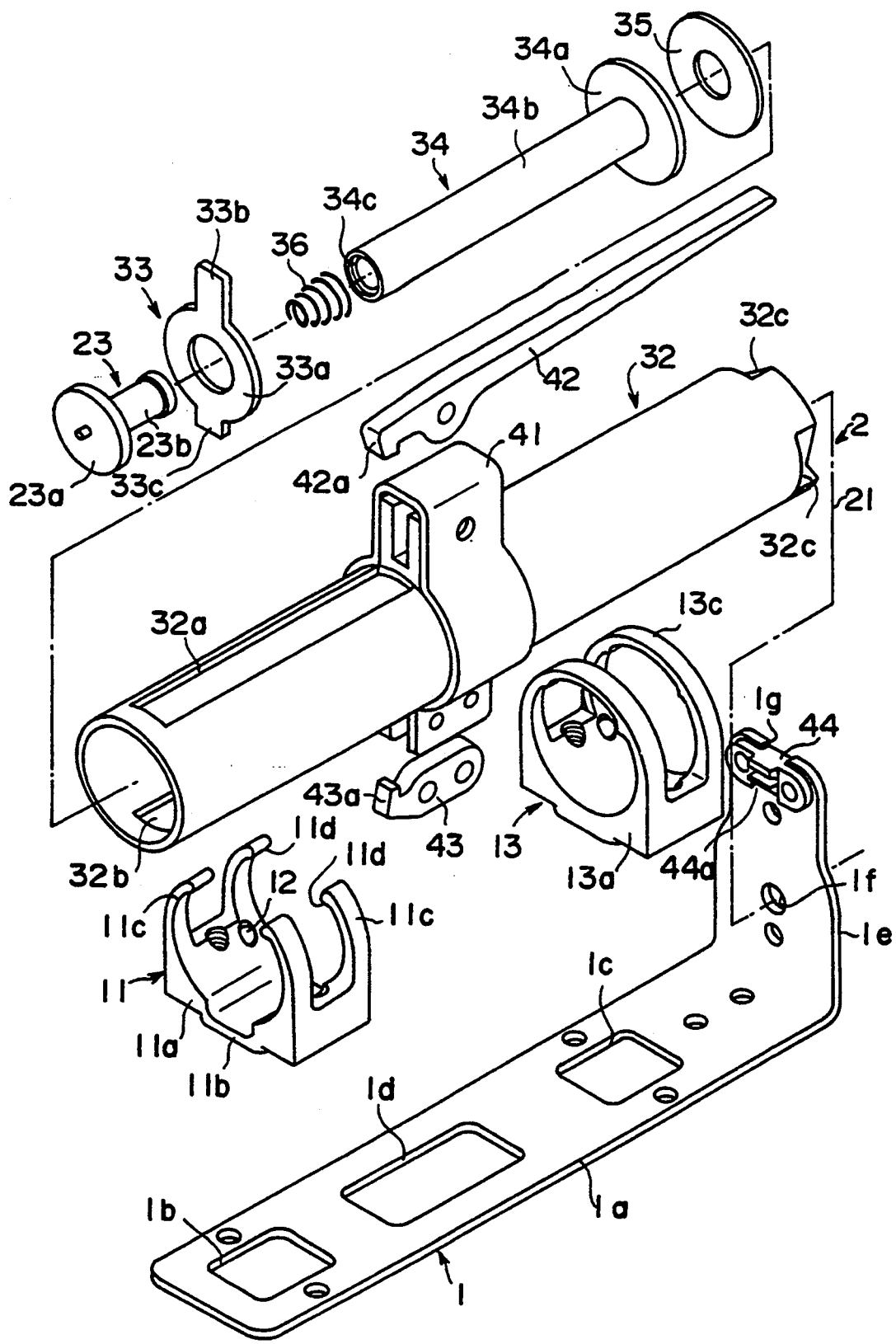
FIG. 2 is an exploded perspective view of some of the components of the embodiment.

In this description, the relative positions of the components are given with respect to the installation of the pretensioner in a vehicle (the left portion in FIG. 1 is toward the front of the vehicle). As shown in FIG. 2, the fixed support member 1 is L-shaped, and a pair of front and rear rectangular holes 1b and 1c engaging with bases of a pair of guides 11 and 13 are formed on a horizontal longer leg portion 1a of the fixed member, and a rectangular hole 1d that is in clearance with the trigger mechanism 4 is formed at the center of the fixed member. At the center of a vertical shorter leg portion 1e of the fixed member 1, an opening 1f for receiving a wire rope 21 of the traction member 2 is provided, and an engaging groove 1g of a lever holder 44 as described below is formed on the upper end of the shorter side portion. The rear lower surface of the longer leg portion 1a is used as a screw attachment location to a buckle bracket 5, and the rear surface of the shorter leg portion 1e is used as a screw attachment location for a support bracket 62, which rotatably supports a device 6 for changing the pulling direction of the wire rope 21.

A front guide 11 fixed on the fixed member 1 by a screw is provided with a projection 11b projecting downwardly from a base 11a and engaging with a rectangular hole 1b, and it is also provided with a pair of left and right fork-like supports 11c extending in curve upwardly from the base 11a along the outer periphery of the driving means 3. Further, there are provided balls 12, two of which are placed in each of the holes formed at the left and right on a rear portion of the base 11a and supporting the outer periphery of the driving device 3 at four points in cooperation with the support projections 11d, which project inwardly from the tip of each support 11c. A guide 13 is formed substantially in the same manner as the guide 11, except that the left and right portions are joined and surround the drive device 3 in cooperation with the base 13a.

The drive device 3 comprises a main spring 31 (FIG. 1), which is a compression coil spring, a spring guide tube 32 for receiving and guiding it, a spring stopper 33 and a spring guide 34. On the peripheral walls above and below the front half of the spring guide 32, a pair of slits 32a and 32b extending in axial direction are formed. Stoppers 33b and 33c projecting upward and downward from an annular main portion 33a extend into these slits, and the spring stopper 33 is supported in such a manner that it can be slid back and forth. The spring guide 34 comprises a collar-like seat 34a engaged with a recess 32c formed on the rear end of the spring guide tube 32 through a washer 35 to support the end of the main spring 31, a sleeve 34b for supporting the inner periphery of the main spring 31, and an inner graded step 34c for supporting the rear end of a sensor spring 36.

The trigger mechanism 4 comprises a base member 41 fixed approximately at the center of the spring guide tube 32 by welding, a main lever 42 with one end rotatably supported with a pin on the upper side of the base member, a sub-pawl 43 fixed by a pin on the lower side of the base member, and a bar holder 44 engaged in an opening at the uppermost portion of the vertical shorter side portion of the fixed member 1 and fixed by the screw. The main lever 42 is provided with an arm, which is shorter in the front and longer in the rear with respect to the rotating center, which is fixed by a pin to provide a predetermined lever ratio. On the forward end of the lever, a downward pawl 42a is formed to engage with the stopper 33b of the spring stopper 33. The lever holder 44 has an engaging groove 44a extending in the horizontal direction at the front center, and the rear end of the main lever 42 is engaged with the groove 44a. The depth of the groove 44 is determined by the idle stroke of the drive device 3, which constitutes the inertia body. Also, on the front end of the sub-pawl 43, an upward facing pawl 43a to engage with the stopper 33c of the spring stopper 33 is formed similarly to the main lever 42.

The wire rope 21, which serves as the traction member 2, has one end inserted into a hole of a traction pin 73, which is passed through a slit 72a of a lock bracket 72, and a wire end block 22 is crimped onto the wire rope and serves as a pulling unit. The intermediate portion is passed around a guide sheave 61 and is passed forward, while the other end receives a wire end block 23 and serves as a pulled unit. On the forward end of the wire end block 23, there is provided a collar 23a, which is indirectly engageable with the output member 31a of the drive device 3 through the spring stopper 33, and the rear surface of the portion 23b supports the forward end of the sensor spring 36. The sensor spring 36 is a conical spring with its diameter reduced toward the forward end.

A buckle bracket 5 connected to the rear portion of the fixed member 1 is L-shaped with its longer side 5a inclined forwardly and its shorter side 5b in a horizontal position. On its curved portion, a bolt hole 5c for affixing it to the car body is provided. On the longer side 5a, a slit 5d is formed almost over its total length, and a plurality of ratchet teeth 5e are formed on the rear edge of the longer side 5a. A leaf spring 71 is fixed on top of the rear edge. A buckle stalk 8, on top of which a buckle (not shown) is fixed, has its lower end secured on a lock bracket 72 through a bolt, and the shaft of the bolt is inserted into the slit 5d. The lock bracket 72 is in the form of a saddle, riding over the rear edge from both sides of the longer side 5a of the buckle bracket 5. On a side along the longer side portion 5a, a slit for receiving the traction pin 73 is formed, and a connection 72b covering the rear edge serves as an engagement member to be engaged with the teeth 5e.

FIG. 1 shows the pretensioner with the above arrangement positioned in the set condition. The lock bracket 72 is at its uppermost position as it is stopped by the leaf spring 7a, and the buckle stalk 8 connected with the lock bracket is also at its normal raised position. Under this condition, the buckle is at the uppermost position, and a tongue inserted into the buckle keeps the belt, which is inserted therethrough, loosely tightened along the body of the occupant. In this case, the wire end block 23 fixed on the forward end of the wire rope 21 is pushed forward by the spring load of the sensor spring 36 which is placed between the rear surface of the portion 23b and the inner graded step 34c of the spring guide 34. A predetermined gap is maintained between the rear surface of the collar 23a and the front surface of the spring stopper 33 so that a force caused by the spring load of the main spring is not applied to the spring guide tube 32 until the trigger mechanism 4 is operated.

Under this condition, the spring load of the main spring 31 in compressed state is supported by the recess 32c of the spring guide tube 32 through the seat 34a and the washer 35 on one hand, and is supported by the base 41 through the spring stopper 33 and the main lever 42 on the other hand. As the result, the spring load constitutes a closed loop within the inertia body, and the spring guide tube 32 can slide with respect to the guides 11 and 12 without any resistance and without receiving axial spring load by the main spring 31. Being set under this condition, the spring load of the sensor spring 36 is applied on the spring guide tube 32 through the seat 34a and the washer 35. The application of the load by the sensor spring 36 fulfills the function of preventing unnecessary movement of the inertia body and of determining acceleration of the pretensioner in relation to the depth of the groove 44a of the lever holder 44.

When an acceleration higher than a predetermined value is exerted on the vehicle, the drive device 3 serving as the inertia body of the sensor compresses the sensor spring 36 and moves forward. By the forward movement of the drive device 3, the main lever 42 of the trigger mechanism 4 mounted on it also advances. After a predetermined stroke, the engagement member is disengaged from the groove 44a of the lever holder 44, and the main lever is rotated clockwise around the pin 45. Then, the restraint of the spring stopper 33 by the pawl 42a of the main lever 42 is released, and the spring stopper 33 is quickly moved forward as it is pushed by the output end 31a of the main spring 31, which has been restrained in a compressed state. The spring stopper 33 is engaged with the wire end block 23 and pushes it forward, thereby pulling the lock bracket 72 connected to it down.

Figure 3:
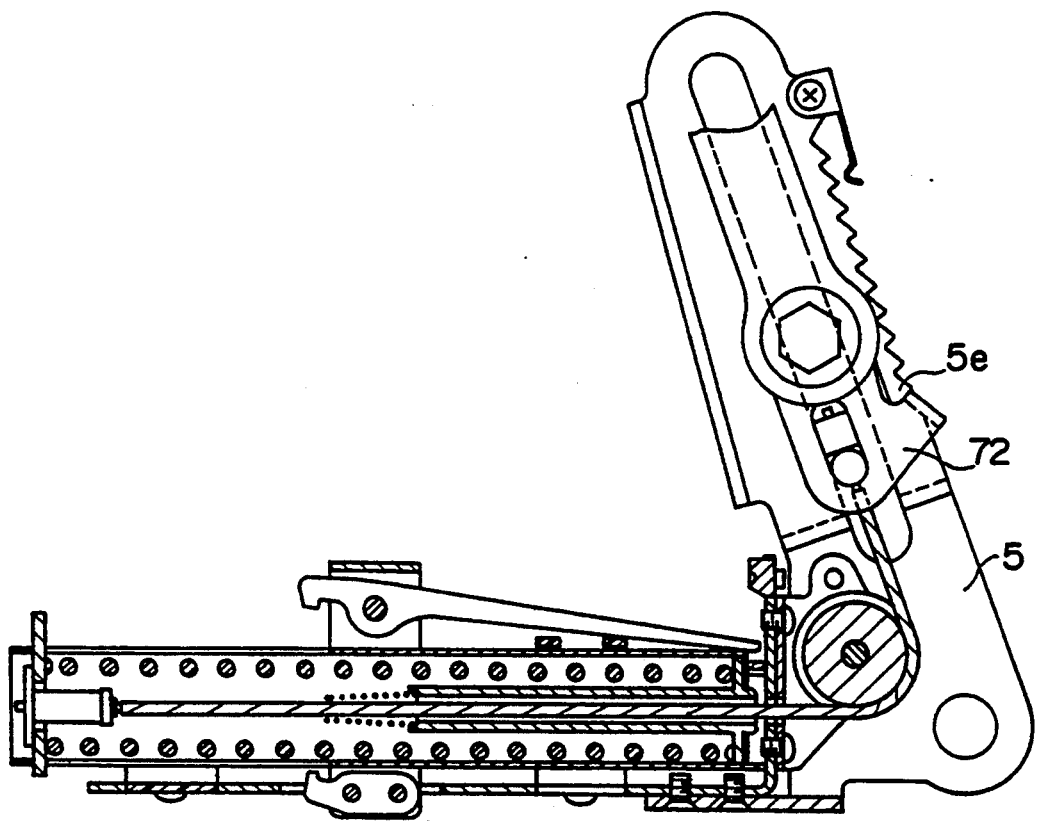
FIG. 3 is a side view showing the embodiment after it has operated.

By this operation, the buckle stalk 8 connected to the lock bracket 72 is pulled down together with the buckle, and the engaging portion 72b of the lock bracket 72 is pushed aside by the teeth 5e of the buckle bracket 5 and moves down to the lowermost position. When it reaches the lowermost position, as shown in FIG. 3, the lock bracket 72 engages with the lowest tooth 5e of the buckle bracket 5, and upward movement of the bracket 72 is restricted by the checking action of the teeth 5e. As the result, relaxation of the belt after the pulling action by the buckle is prevented and the tension imparted to the belt is not released.

In the pretensioner of the above embodiment, the entire movable assembly, namely the drive device 3 and the trigger mechanism 4, serves as the inertia body, and it is designed to increase the mass of the inertia body avoiding unnecessary increase in the weight and size. Thus, despite the increase of inertia mass, the only resistance to the operation of the main spring during driving is the mass of the spring stopper 33, and it is possible to achieve driving with a smaller loss, minimizing the weight of the operating component.

In the above, detailed description has been given of an embodiment of the invention applied to the pulling of the buckle, whereas the present invention is not limited to the above embodiment and can be applied to various parts of the seat belt system. For example, it is possible to wind the traction member on a pulley, which is engaged with the shaft of a belt retractor and to use it as a pretensioner for winding the belt. The specific designs of the components can be modified within the scope of the claims attached hereto.

As described above, it is possible according to the present invention to provide a pretensioner of compact and lightweight design by avoiding the increase in weight and size of the inertia body and by not having a separate inertia body and by minimizing the size and weight of accessory parts such as the fixed member, these advantages being a result of making the driving means and the trigger mechanism function as the inertia body.

I claim:

1. A pretensioner for a vehicle seat belt system comprising a fixed support member, axially acting driving means having an output member movable along an axis upon operation of the driving means, the driving means being supported by the support member for movement relative to the support member along the axis, trigger means mounted on the driving means for normally restraining the driving means by releasably coupling the output member thereof to the support member and for releasing the driving means in response to acceleration of an inertia mass greater than a predetermined value, the inertia mass including the driving means and the trigger means which move relative to the support member, and a traction member that is engaged by the output member of the driving means for transmitting an output force of the driving means to the component upon operation of the driving means.

* * * * *